United States Patent [19]

Green et al.

[11] 4,068,011
[45] Jan. 10, 1978

[54] METHOD OF PEELING ONIONS BY SCALDING AND CUTTING

[75] Inventors: Glen R. Green; Joseph L. Hodges, both of Ontario, Oreg.

[73] Assignee: Ore-Ida Foods, Inc., Boise, Idaho

[21] Appl. No.: 617,821

[22] Filed: Sept. 29, 1975

[51] Int. Cl.² .................... A23L 1/212; A23N 7/00
[52] U.S. Cl. .................................. 426/482; 426/509
[58] Field of Search ............... 426/482, 481, 506, 509, 426/518; 99/587, 546, 518, 584

[56] References Cited

U.S. PATENT DOCUMENTS

| | | | |
|---|---|---|---|
| 1,312,332 | 8/1919 | Kirino | 426/482 |
| 1,325,847 | 12/1919 | Horst | 426/482 |
| 2,277,003 | 3/1942 | Polk, Jr. | 99/587 |
| 2,445,881 | 7/1948 | Hemmeter | 99/584 |
| 2,556,385 | 6/1951 | Allan | 99/584 |
| 2,766,794 | 10/1956 | Odale | 426/482 |
| 2,888,969 | 6/1959 | Hardesty et al. | 99/587 X |
| 2,888,969 | 6/1959 | Hardesty et al. | 99/587 X |
| 2,979,097 | 4/1961 | Rogers et al. | 99/584 |
| 3,623,524 | 11/1971 | Buck | 99/516 |
| 3,696,848 | 10/1972 | Mellon et al. | 99/516 |
| 3,959,506 | 5/1976 | Kunz | 426/482 |

Primary Examiner—S. Leon Bashore
Assistant Examiner—Steve Alvo
Attorney, Agent, or Firm—Mallinckrodt & Mallinckrodt

[57] ABSTRACT

Whole raw onions, as harvested, are cleaned and scalded sufficiently to slicken the membrane interface between the outermost and next inner layers of flesh without appreciably affecting the interfaces between subsequent layers of flesh. The root and stem ends are then cut off, and the outermost layers of flesh of each onion bulb and any outer skin adherant thereto is cut longitudinally along the root-stem axis of the bulb to provide a slit therealong. The so-slit onion bulb is then gripped at opposite sides of and along the slit, and the slit outermost layer of flesh and any adherant skin are pushed downwardly and stripped from the onion bulb, followed by separation of the strippings and the remaining bulb.

5 Claims, 19 Drawing Figures

METHOD OF PEELING ONIONS BY SCALDING AND CUTTING

BACKGROUND OF THE INVENTION

1. Field

The invention is in the field of methods and machines for peeling onions on an industrial, mass production basis in the commercial production of food products utilizing onions.

2. State of the Art

The art is well developed with a variety of proposed procedures and machines, including the slicing off of root and stem portions by rotary knives, the impaling of the onion bulbs on sharpened pins or tines for holding purposes, the cutting through outer skin and outermost layer of flesh, and the use of air or water jets to peel off the outer skin and any imperfect concentric layer of flesh. Nonetheless, the economics of large scale production of commercial food products requires maximum efficiency in handling. The present invention is directed toward that end.

SUMMARY OF THE INVENTION

In accordance with the invention, raw onions as received from the field are scrubbed, washed, and scalded sufficiently prior to peeling to slicken the membrane interface between the outermost and the next inner layers of flesh. The root stem ends are then cut off, and the outermost layer of flesh of each onion bulb and any outer skin adherant thereto is cut longitudinally along the root-stem axis of such bulb to provide a slit therealong. The so-slit onion bulb is then gripped at opposite sides of and along the slit, and the slit outermost layer of flesh and any adherant skin are pushed downwardly and stripped from the onion bulb, followed by separation of the strippings and the fully peeled onion bulb.

Utilizing a preferred embodiment of the machine of the invention, the peeling procedure comprises individually depositing the scalded onions in respective receiving cups, so their root-stem axes extend transversely across and substantially at right angles to a predetermined path of travel; raising the onions from their respective cups while holding them securely in their received orientation relative to the predetermined path of travel; moving both cups and onions in unison along the predetermined path of travel; cutting off root and stem end portions of the onions as they travel; turning the remaining onion bulbs at right angles to the initial orientation; cutting through any skin remaining and through the outermost layer of flesh of the onion bulbs, longitudinally along the root-stem axes thereof as they travel along the predetermined path, while holding them securely with respect to the cups; stripping the outermost layer of flesh from the so-cut onion bulbs by gripping such bulbs at opposite sides of the respective slits cut therein and pushing downwardly, while continuing to hold the bulbs securely with respect to the cups; lowering and releasing the onion bulbs with respect to the cups; and separating the strippings and the fully peeled onion bulbs.

The peeling machine for carrying out such procedure comprises an endless conveyor provided with at least one endless line of onion-receiving-and-holding cups, but preferably with several laterally spaced endless lines of such cups, and with sequential operating stations through which such cup-type conveyor passes. A first station comprises cushioned rolls above the conveyor for holding down onions, which have been previously placed sidewise in the cups, while they are being impaled from below by respective tines. A second station comprises a set, or laterally spaced sets as the case may be, of mutually spaced, rotating, disc-type cutters for cutting off root and stem ends of the onions, such sets of cutters being preferably provided with corresponding feelers for setting the cutters properly to cut off only to predetermined depths depending upon onion size. Mechanism is provided between the first and second stations for raising the bottoms of the onion-receiving cups as pedestals, so the onions will be elevated above the cups for the cutting operation. Between the second and third stations, mechanism is provided for turning the pedestal bottoms of the cups at right angles, so the root-stem axes of the residual onion bulbs will be aligned in the direction of conveyor travel. The third station comprises a rotating disc cutter, or several laterally spaced rotating disc cutters as the case may be, extending longitudinally of the root-stem axes of the re-oriented onion bulbs and adapted to cut through the outermost flesh layer and any adherant outer skin of the respective onion bulbs as the conveyor travels, producing longitudinal slits at and along the tops of the respective onion bulbs. A fourth station comprises stripper devices arranged to grip the respective onion bulbs at opposite sides of the longitudinal slits and to strip the slit outer layer of flesh and any adherant outer skin downwardly; and a fifth station comprises mechanism for separating and discharging the strippings and the fully peeled onion bulbs. Between the fourth and fifth stations, the onion bulbs are lowered and the tines withdrawn.

An onion-aligning feeder is preferably employed to transport the washed and scalded onions to the cup-type conveyor and deposit them in the cups thereof. The onions as so deposited are preferably oriented in the respective cups by hand.

THE DRAWINGS

A machine representing the best mode presently contemplated of carrying the invention out in actual practice is illustrated in the accompanying drawings, in which.

DETAILED DESCRIPTION OF THE ILLUSTRATED EMBODIMENT

Figure 1:
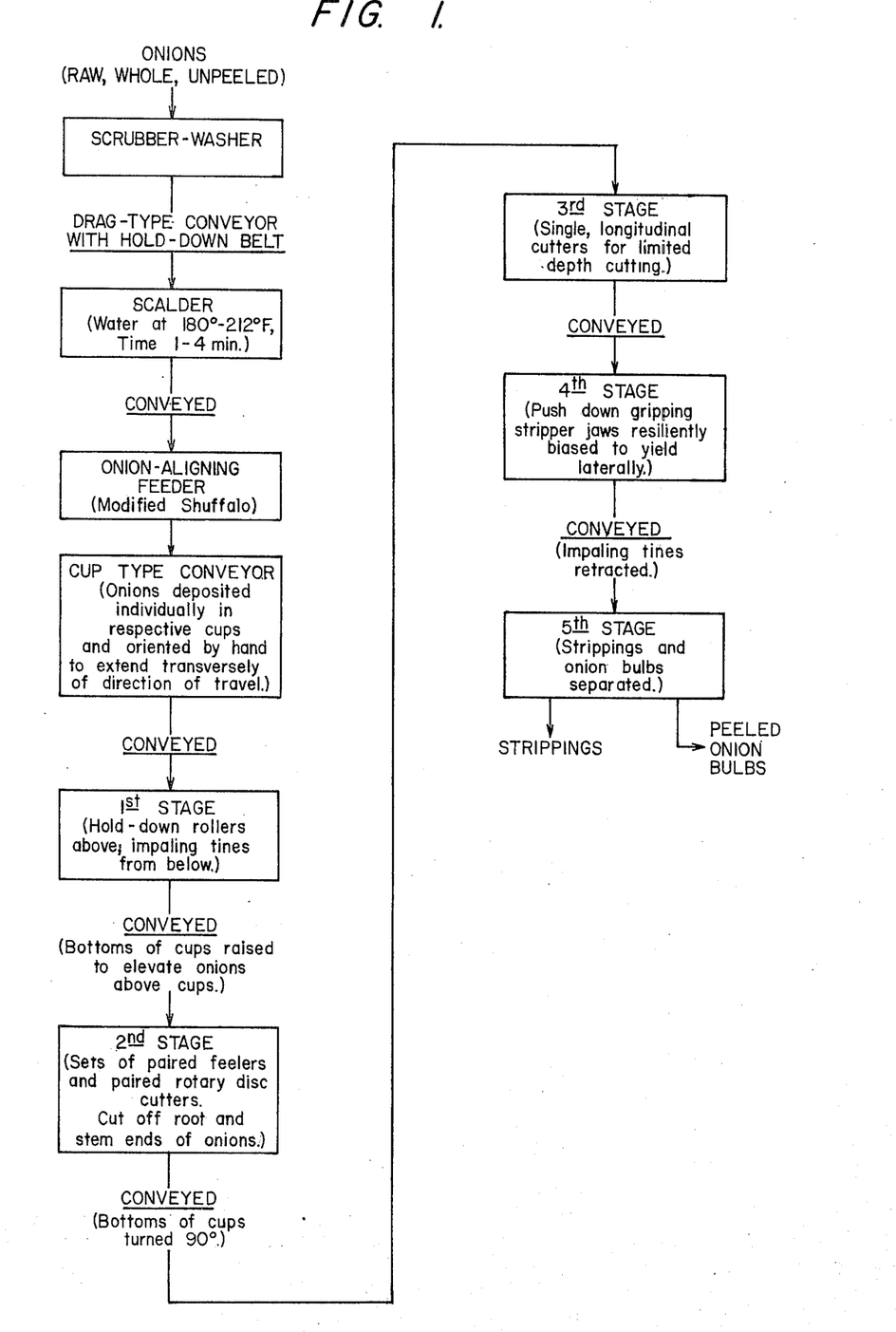
FIG. 1 is a flow sheet of the method as carried out by the machine of the subsequent FIGS.

In the embodiment illustrated, see the flow sheet of FIG. 1, raw, whole, unpeeled onion as harvested are scrubbed and washed in any appropriate manner, usually in a commercial scrubber-washer utilizing plain or chlorinated water. They are then subjected to a scalding treatment for slickening the interface between the outermost and next inner layer of flesh. Scalding is advantageously carried out on a continuous basis by equipment (not illustrated) comprising a drag-type conveyor and a hold-down belt that carry the onions through a confined body of scalding water maintained at a temperature within the range of about 180° to about 212° F. Commercial equipment of this type is available, or can be easily constructed utilizing commercially available components such as a Penberthy steam ring heater in an elongate tank through which the conveyor and belt extend.

This scalding treatment is a very important step in the overall method. It not only slickens the interface as previously noted but also wilts the exterior skin of the onions, preparing them for subsequent steps, particularly the step of mechanically stripping the outermost layer of flesh from the onion bulbs.

Following the scalding treatment, the onions are individually placed on respective receiving cups for travel along a predetermined path through sequential treatment or operating stages of the method. Placement may be accomplished manually, but is preferably carried out by special conveying equipment adapted to arrange the onions in several side-by-side, longitudinally extending lanes corresponding to side-by-side lanes of cups extending longitudinally of a cup-type conveyor adapted to carry the onions, mutually spaced both laterally and longitudinally, through the several operating stages of the method and corresponding stations of the machine. Special conveying equipment of the type required is commercially available under the name of "Shufflo Singulator Feeder" as manufacturing by Magnuson Engineers, Inc., San Jose, California. For onion-aligning purposes, scalloped flights are employed. The scallops are aligned longitudinally of the conveyor in side-by-side lanes corresponding to the several side-by-side lines of cups of the cup-type conveyor.

Whether fed manually or mechanically, the onions are deposited in the respective cups of the cup-type conveyor and arranged therein so that their root-stem axes extend transversely of the direction of travel of the conveyor. As so arranged, they are properly oriented for passing through the first operating station associated with the conveyor.

From a method standpoint, the several treatment stages carried out by the several operating stations associated with the cup-type conveyor provide for, first, firmly securing the onions in place on and with respect to the respective cups; second, cutting off the root and stem ends of the respective onions as they travel, third, cutting slits at the tops of the respective onion bulbs longitudinally of the root-stem axis and through the outermost flesh layer and any adherant outer skin; fourth, gripping the respective onion bulbs at opposite sides of the slits and pushing downwardly to strip down such outermost layer of flesh and any adherant skin from each bulb; and, fifth, separating the strippings and the residual, peeled onion bulbs.

In the illustrated embodiment, the onions are held down on the respective cups by cushioned rollers in the first stage of the method and at the first station of the machine, while tines are pushed up through the bottoms of the cups to impale the onions and anchor them firmly on such cup bottoms serving as pedestals. Between the first and second stages or stations, the pedestal bottoms of the cups are raised to lift the onions above their respective cups while they are being carried through respective pairs of spaced rotary disc knives and associated feelers for cutting off root and stem ends. Between the second and third stages or stations, the cup bottoms, i.e. pedestals, are rotated 90° to orient the onions with their root-stem axes extending along the direction of travel of the conveyor for proper cutting of the outermost flesh layer and any adherant skin during the third stage. Between the fourth and fifth stages or stations, the pedestals are lowered (preferably only to the tops of the cups) and the impaling tines are withdrawn so the peeled onion bulbs can be discharged at the fifth station which comprises a snub roll separator and a conveyor belt discharging laterally of such separator.

The machine for carrying out the method on the onions as washed and scrubbed and scalded comprises, in the illustrated embodiment, a modified "Shufflo Singulator Feeder" 20 having sets of forwardly sloping, up and down reciprocating flights 21 adapted to feed onions in mutually spaced, seriatim arrangement to a cup-type, endless conveyor 22 from four side-by-side, discharge lanes 20a, 20b, 20c, and 20d. Flights 21 are scalloped to cradle the onions and to drop them into the respective lanes.

Figure 5A:
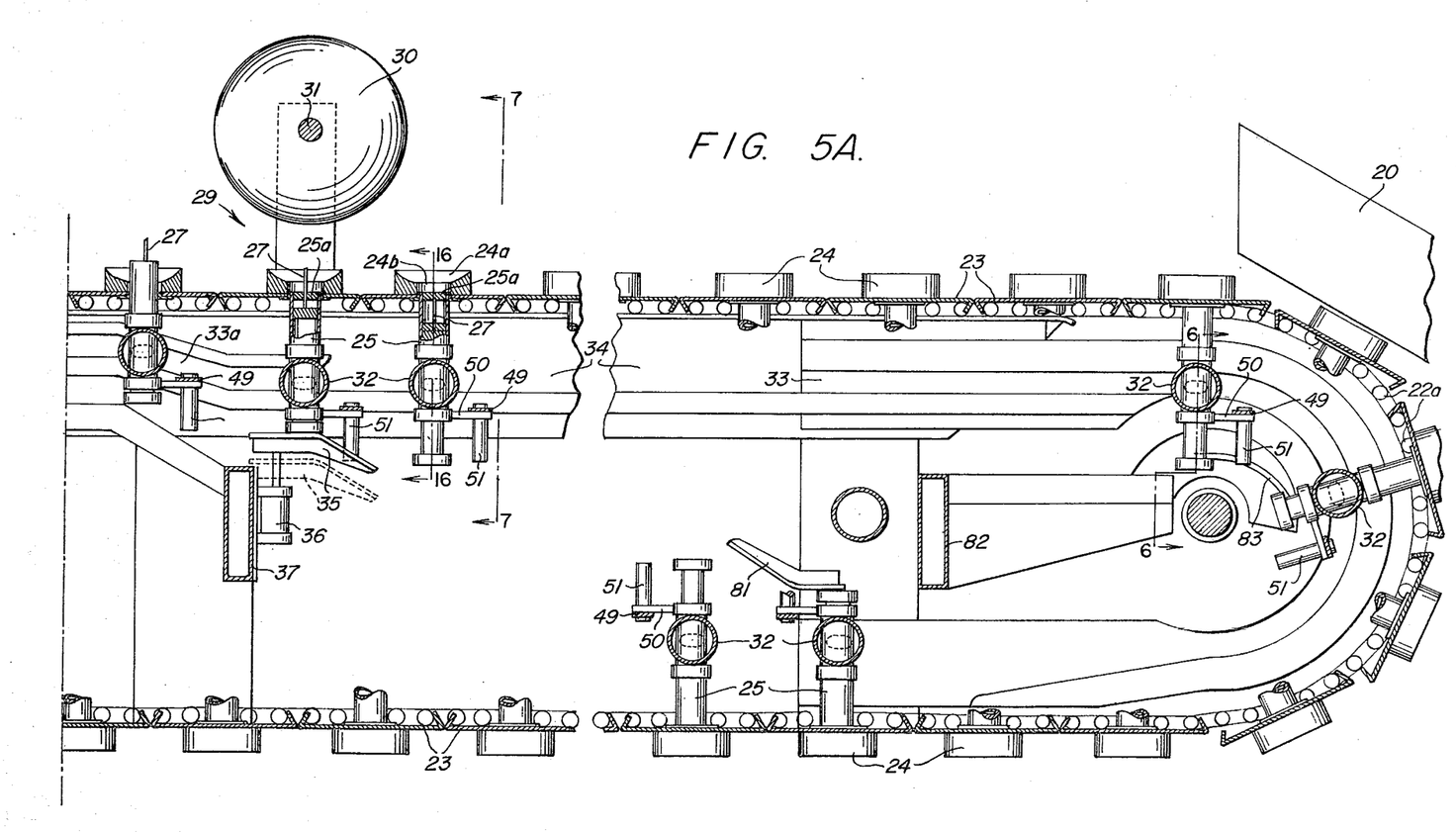
FIG. 5A, a fragmentary view in longitudinal vertical section as taken on the line 5A—5A of FIG. 3 to show the righthand portion of the machine, the view being drawn to a considerably larger scale and the conveyor having been moved slightly to the left from the standpoint of FIG. 3 to center the cups within the respective operating stations of the machine.

Conveyor 22 comprises a wide, endless belt made up of transversely extending, articulatively connected, substantially rigid slat sections 23 attached at their opposite ends to endless roller chains 22a on respectively opposite sides of the machine, which are driven by head sprockets 22b powered by a drive connection with a motor (not shown). Each slat section 23 carries on its upper surface a transversely extending row of mutually spaced cups 24 upon which are placed respective onions to be peeled. The cups are arranged on the respective sections so that they extend longitudinally of the conveyor in lanes corresponding to the discharge lanes of feeder 20. As best shown in FIG. 5A, such cups 24 are preferably formed to provide concavities 24a adapted to support the onions as received, without enclosing them. Each cup has a central opening 24b closed by a movable cup bottom constituting the top member 25a of a hollow element 25 arranged to be moved upwardly and downwardly with the opening 24b and to serve as a pedestal for supporting a received onion and lifting it out of the cup as required. Although the designation "cup" is used here, it should be realized that initial circumferential support for a received onion is the important thing and that a ring or other similar supporting structure would serve and is to be included in the scope of that designation.

Within each pedestal 25 is a piston 26 adapted to slide upwardly and downwardly and provided with a set of upwardly projecting tines 27 which are arranged to pass through receiving holes in top member 25a and through the opening 24b of the particular cup 24 concerned as piston 26 rises within its pedestal 25, thereby impaling the onions supported by such cups 24.

Figure 7:
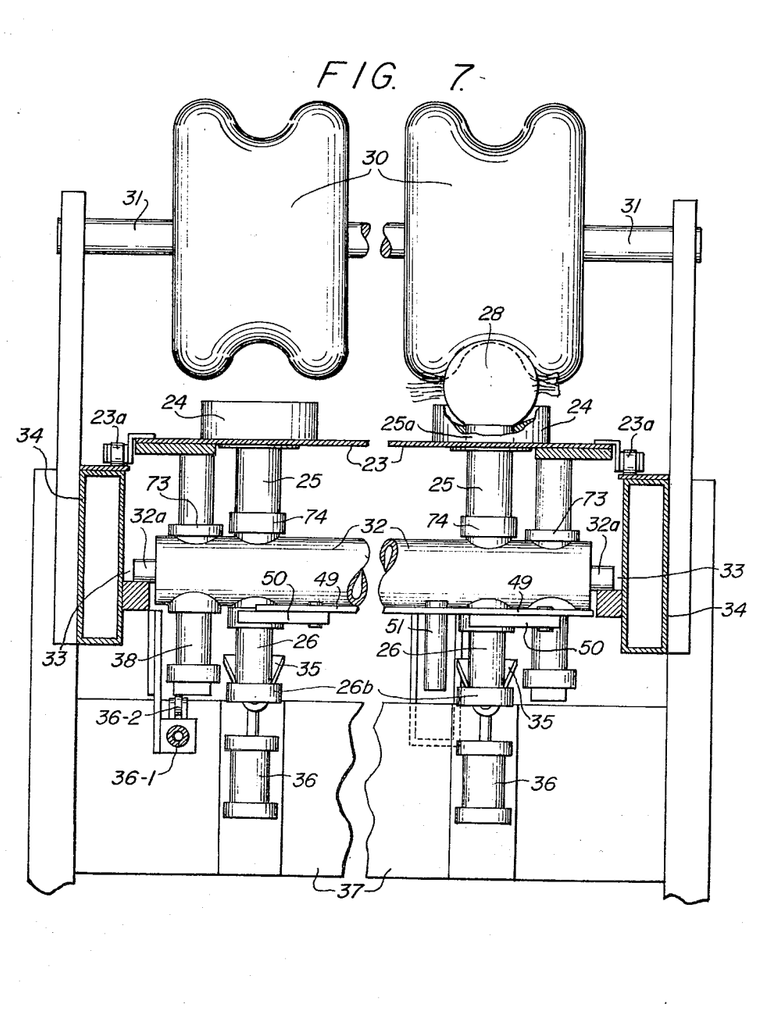
FIG. 7, a similar view taken on the line 7—7 of FIG. 5A.
Figures 8, 9, 14, 16:
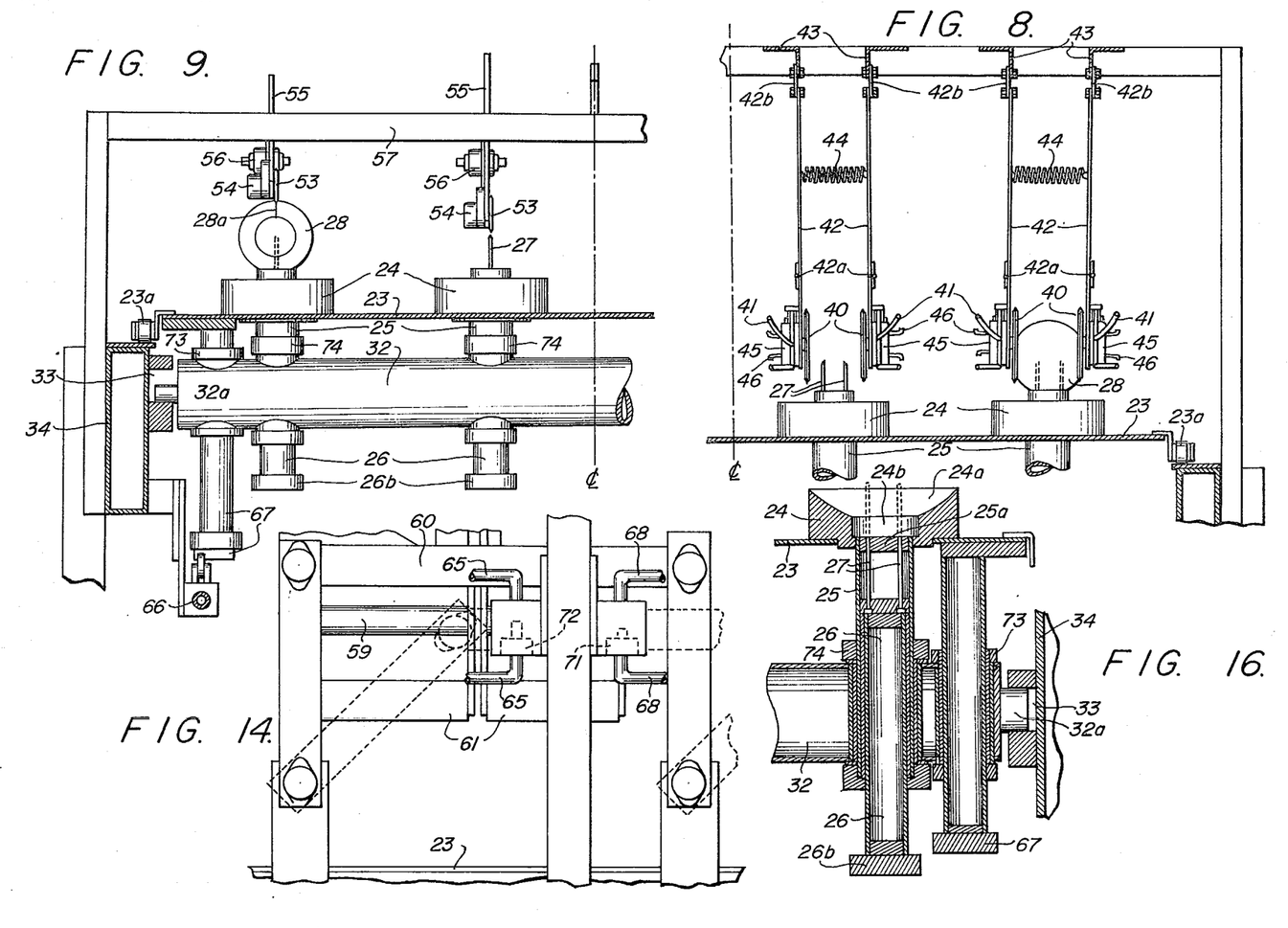
FIG. 8, 9, and 10, similar views taken, respectively, on the lines 8—8, 9—9, and 10—10 of FIG. 5B.
FIG. 14, a fragmentary elevation taken on the line 14—14 of FIG. 3 and drawn to the larger scale of FIGS. 6-9.
FIG. 16, a fragmentary, transverse, vertical section taken on the line 16—16 of FIG. 5A and drawn to the larger scale of FIGS. 6 and 7.
Figure 13:
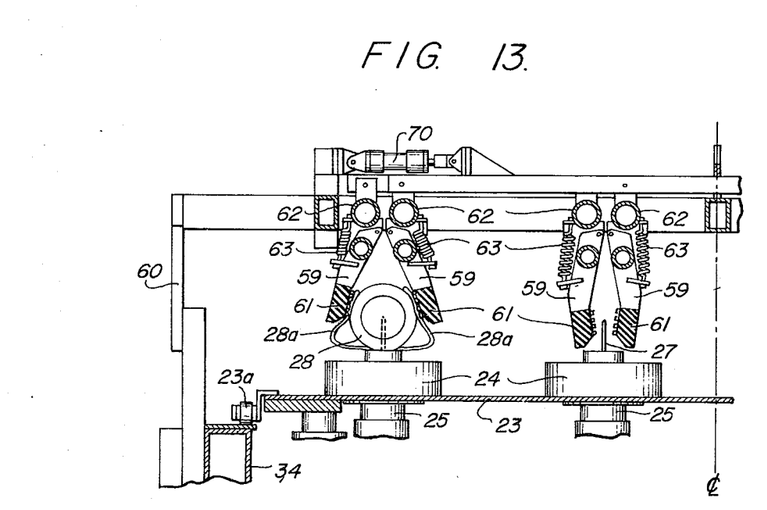
FIG. 13, a fragmentary, transverse, vertical section taken on the line 13—13 of FIG. 11 and drawn to a slightly larger scale.

Washed and scalded onions, see 28, FIG. 7, 8 and 13, are fed into cups 24 by the "Shufflo" feeder 20, being deposited individually on the respective cups as each conveyor slat section 23 passes under the discharge end of the feeder. Such onions 28 are arranged on the cups by hand, so that each is oriented with its root-stem axis extending transversely of the diretion of travel of conveyor 22. Although it is presently preferred to arrange the mechanically deposited onions by hand, any suitable mechanical device could be used instead.

As so oriented in the cups 24, the onions 28 are carried to and through a first stage of the method performed at a first station 29 of the machine. Such station 29 comprises hold-down means for the onions as they pass through, preferably comprising a transversely extending series of flexible rollers 30 mounted on a shaft 31 for free rotation above the respective longitudinal lines of cups 24 of conveyor 22. Rollers 30 are advantageously circumferentailly grooved as shown and made of rubber or a rubber-like material so as to be soft and yieldable, yet firm enough to hold the onions down on their respective cups without bruising them while they are being impaled from below.

In order to impale the onions while they pass under and are held down by rollers 30, pedestals 25 are securely mounted on transversely extending supports 32, see particularly FIGS. 5A and 7, having cam follower members 32a at their ends which are received by and ride along camtracks 33 defined by elongate members affixed, respectively, to the inside surfaces of structural frame members 34 of supporting framework for the machine. Camtracks 33 extend longitudinally of the machine at opposite sides thereof and provide for raising and lowering pedestals 25 at appropriate times as the conveyor travels.

Impaling of the onions at first station 29 as they pass under and are held down by rollers 30 is accomplished by forceably raising pistons 26, which are elongate and project downwardly through the open bottom of the respective pedestals 25, see FIG. 16, to approximately the level of platforms 35, see FIGS. 5A and 7, of a transversely extending row of same corresponding in number and position to cups 24 in a row thereof, see FIG. 7. Each platform 35 is mounted on a power cylinder 36, advantageously pneumatic, for raising and lowering as compressed fluid from any convenient source is let into and released from, respectively, such cylinders under the control of a valve 36-1. The power cylinders 36 and control valve 36-1 are secured to a transverse beam member 37 of the framework of the machine.

As each row of cups 24 reaches the row of platforms 35, a valve actuator 38, FIG. 7, trips the operating lever 36-2 of valve 36-1, causing power cylinders 36 to raise platforms 35. This forces pistons 26 upwardly, so tines 27 impale the onions carried by cups 24 before such cups pass out from under hold-down rollers 30. Release of valve lever 36-2, as the row of cups travels beyond station 29, lowers platforms 35 in advance of arrival of the next row of cups at such station 29.

Continued travel of each row of cups carries cam followers 32a of its support 32 to upwardly inclined portions 33a, FIG. 5A, of camtracks 33, and further travel raises pedestals 25 relative to their respective cups, thereby raising the impaled onions thereon well above the tops of their cups (e.g. one and three-eighths inches) and places them in position for passing through subsequent stages of the method as carried out at second, third and fourth stations of the machine.

Figure 4:
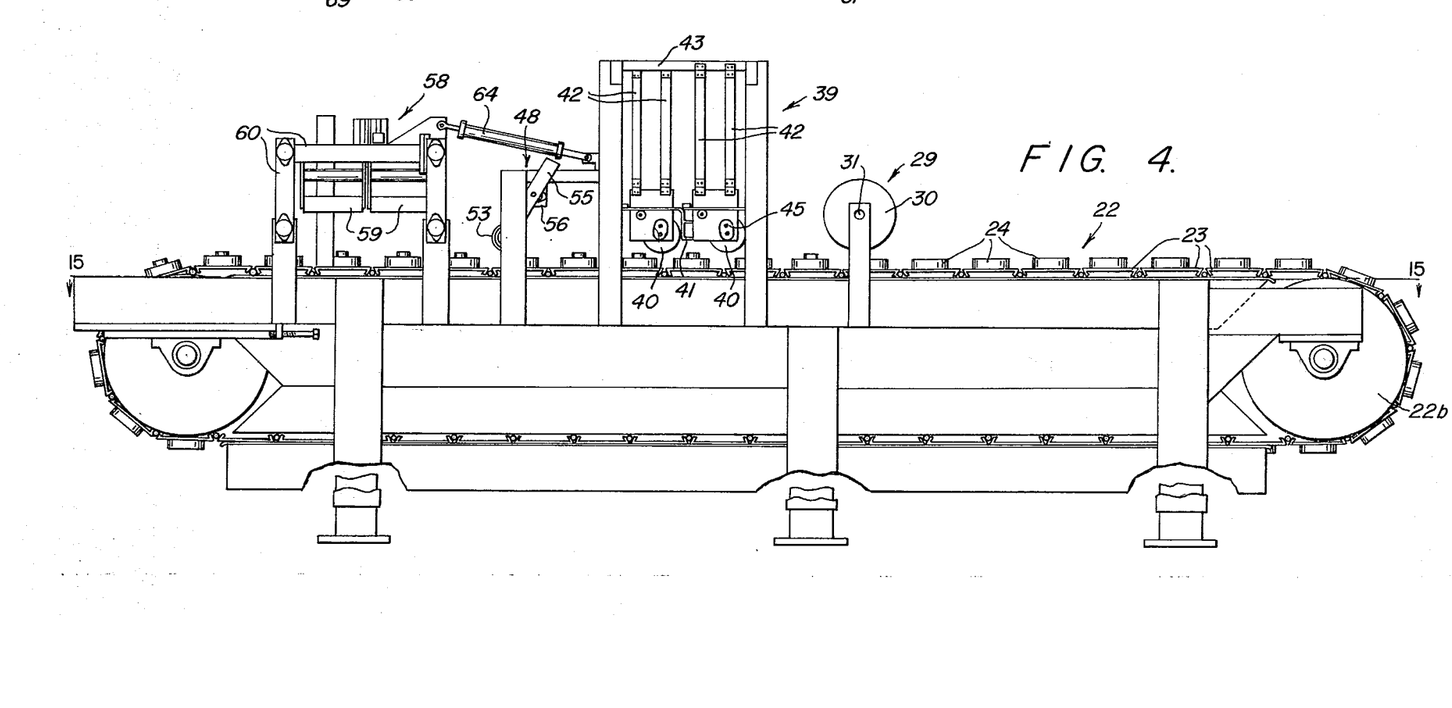
FIG. 4, a corresponding side elevation.
Figures 5B, 11:
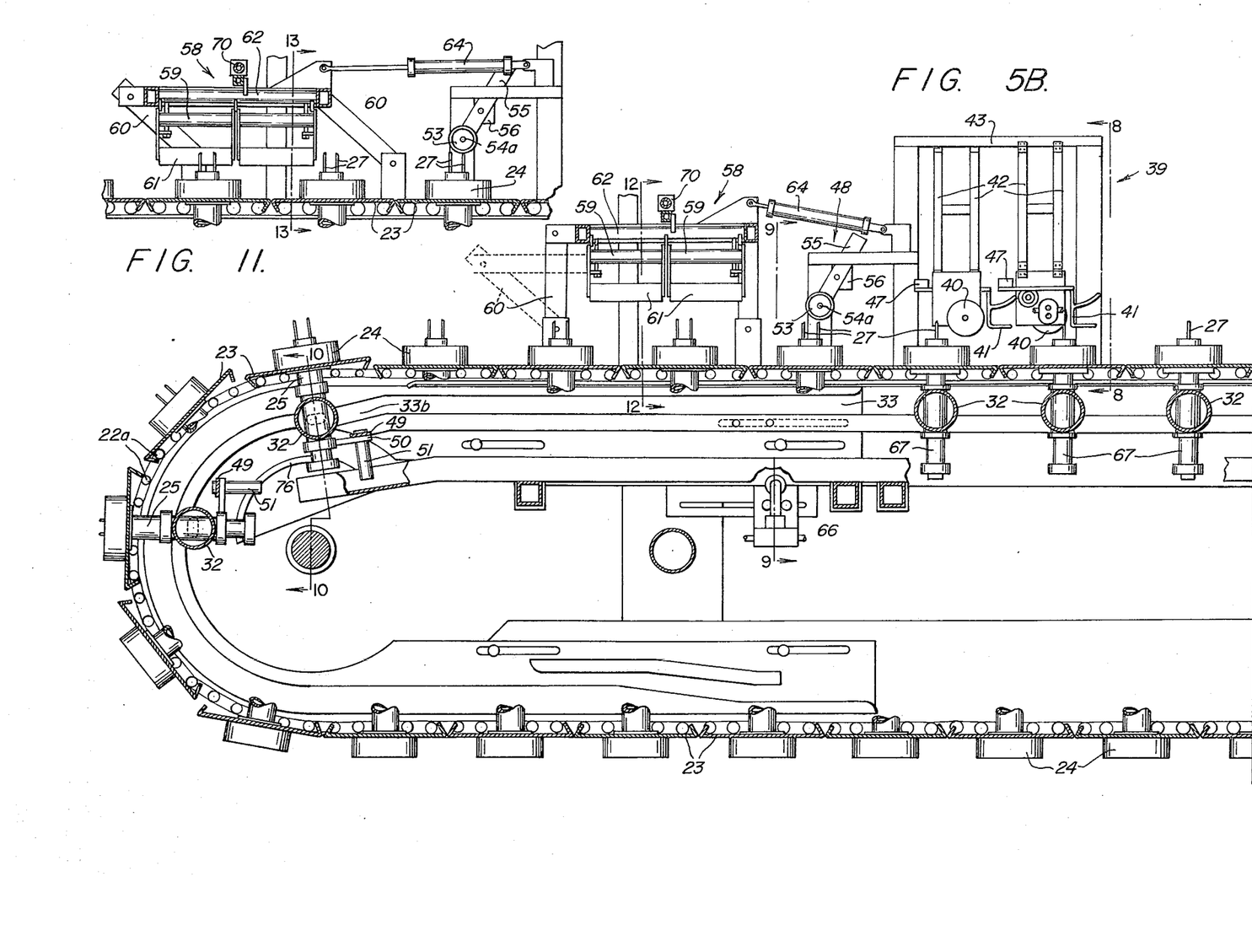
FIG. 5B, a similar view showing the lefthand portion of the machine, as taken on the off-set line 5B—5B of FIG. 3 for the lower portion of the view below the upper run of the conveyor, and on the straight lines 5A—5B for the upper portion of the view.
FIG. 11, a fragmentary, longitudinal, vertical section taken on the line 11—11 of FIG. 3 and drawn to a slightly larger scale, the conveyor having been moved ahead as in FIG. 5A and 5B.

Second station 39 comprises a double row of paired rotary disc cutters 40 and associated feelers 41, FIGS. 4, 5B and 8, suspended on elongate frames 42 from supports 43, there being two pairs in front and two in back arranged alternately so as to have room to adjust to different sized onions. The frames 42 are hinged, as at 42a, intermediate their lengths, and as at their connections 42b with supports 43, for articulation transversely of the machine. Springs 44, FIG. 8, are interposed between the paired frames 42 to provide for expansion and retraction laterally in accordance with the sizes of onions passing there between.

As the onions enter the travel lanes defined between such paired frames 42, the feelers serve to gauge onion size and to push the frames and the rotary cutter discs carried thereby outwardly on their hinge connections by distances dependant upon size variations of the onions passing through. The cutter discs then cut off only minimum depths at the root and stem ends of the onions, as predetermined by cutter disc placement relative to the feelers.

The cutter discs are continuously rotated during operations of conveyor 22 by respective fluid motors 45 supplied with fluid from a pressure source of same (not shown) and flowing through appropriate hoses and fittings 46 of a circulation systems. The feelers 41 are counterbalanced at 47, FIG. 5B, to smooth out gauging reaction.

Figure 15:
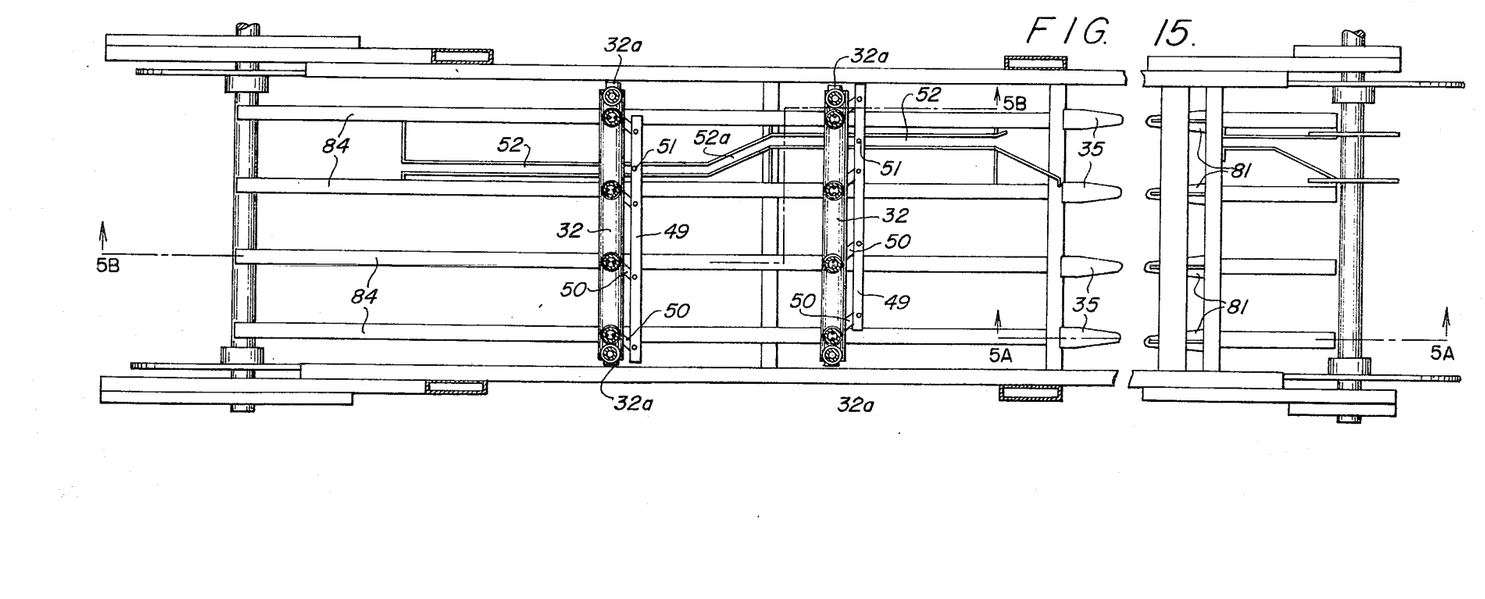
FIG. 15, a horizontal section taken on the line 15—15 of FIG. 4, intermediate parts being broken out for convenience of illustration.

As each row cups 24 continues its travel from second station 39 to third station 48 along the path of travel of conveyor 22, pedestals 25 are rotated 90° to place the carried onions so that their root-stem axes extend longitudinally along the direction of travel of the conveyor. This is accomplished by means of a bar 49, FIGS. 7 and 15, for each row of cups, paralleling pedestal support 32 and connected with the individual pedestals thereof by respective links 50. A cam follower pin 51, FIG. 5A and 5B, depends from bar 49 and enters and rides along a camtrack 52 that extends longituinally between stations 39 and 48 and has a camming jog 52a.

Third station 48 comprises a transversely extending row of rotary cutter discs 53, FIGS. 3, 4, 5B, 9, and 11, having respective transversely extending axes of rotation provided by drive shafts 54a of respective fluid motors 54. Such cutter discs and motors are mounted on the lower ends of respective levers 55, which are fulcrumed by respective pivotal mountings 56 depending from a cross beam 57. As so mounted, the cutter discs are counterweighted to rest lightly on the mid-circumferential portions of the respective onions 28, see FIG. 9, and to cut a slit 28a through the outermost flesh layer and any adherant outer skin of each as the onions pass thereunder. In practice, the cutter disc may dip into the next flesh layer of the onion without harmful results so long as it does not cut through more than about one-half the thickness of such next flesh layer.

Fourth station 58 comprises a double row of strippers 59 arranged to operate on all the onions in two consecutive rows of cups at each forward downstroke of a parallel motion frame 60 on which such strippers are mounted. This gives time for the backward upstroke of such frame while the next two onion rows are moving into position for stripping.

Figure 12:
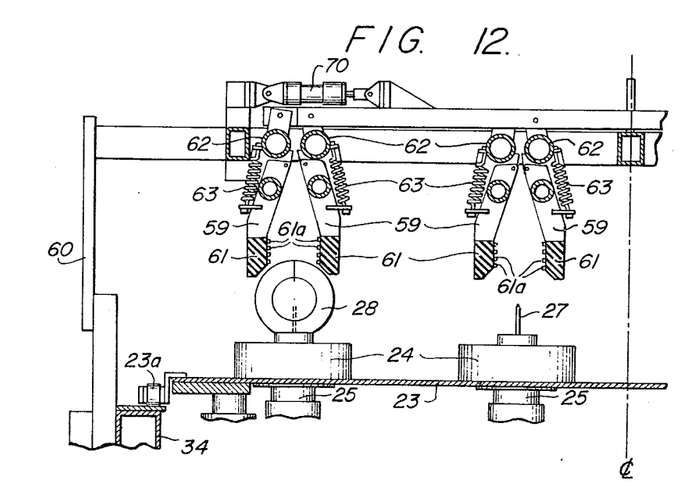
FIG. 12, a view similar to those of FIG. 8, 9, 10 but taken on the line 12—12 of FIG. 5B.

Each stripper comprises a pair of gripping jaws 61 of rubber or the like faced with sharp cornered cleats 61a, FIGS. 12 and 13, so as to dig into the onion when the jaws are closed. The jaws are suspended from respective pivot shafts 62 and hang freely to the extent permitted by sets of springs 63, which provide for onion size accommodation and for expansion of the jaws as they follow the bulbous contours during stripping downstrokes.

Stripping downstrokes and return upstrokes of parallel motion frame 60 are effected by a hydraulic power cylinder 64 operated by the introduction of hydraulic fluid under pressure from a circulation system 65, FIG. 14, under the control of one side of a dual air valve 66 which is sequentially actuated by trippers 67, FIG. 9, depending rigidly from every other one of the support elements 32, see FIG. 5B. At the same time, hydrualic fluid under pressure from a circulatory system 68 is sent by the other side of dual air valve 66 to hydraulic power cylinders 69 and 70, FIGS. 1 and 3, for closing jaws 59.

Toward the end of the forward downstroke of frame 60, such frame trips an air valve 71, FIG. 14, which causes power cylinders 69 and 70 to operate in the reverse directions. At the end of the downstroke, frame 60 trips an air valve 72, which causes power cylinder 64 to retract and lift the frame on its backward upstroke in preparation for another cycle of operation.

It should be noted that both trippers 38 and 67 maintain fixed positions relative to conveyor 22 to which they are fixedly secured and that supports 32 are provided with slideways, see 73, FIG. 16, respectively, so that such supports can slide freely relative to the trippers as they are raised by reason of their cam ends 32a riding up the inclined portions 33a of camtracks 33 to raise pedestals 25 which are fastened to supports 32 by mounting structure 74. Whether or not the depending elements serving as trippers in this embodiment are actually utilized for switch-tripping purposes in other embodiments, they are important as guides for the raising and lowering of supports 32 which raise and lower pedestal elements 25.

Figure 10:
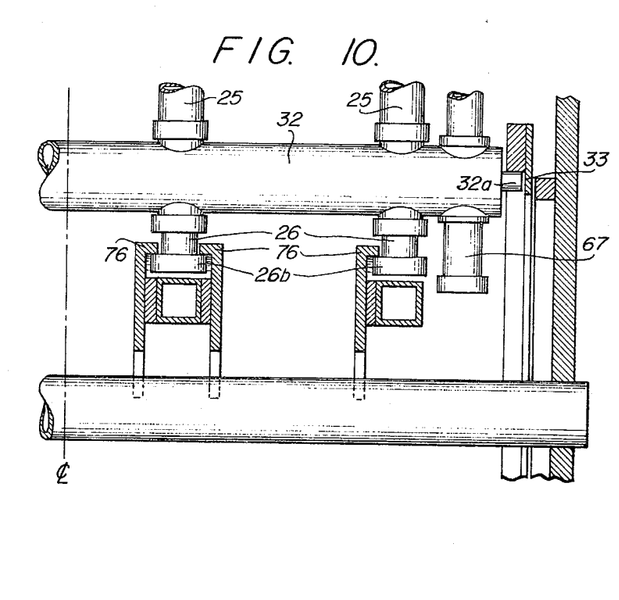

Following the stripping operation, the rows of cups 24 carrying the stripped onions 28 and any strippings 28a, FIG. 13, still attached thereto travel onward toward a fifth operating station 75, meanwhile having their pedestal cup bottoms 25a lowered to approximately flush with the tops of the cups and their tines 27 withdrawn from the onions. The pedestal lowering is accomplished when cam ends 32a of supports 32 enter and ride down a downwardly inclined portion 33b, FIG. 5B, of camtrack 33, and the tines withdrawal is accomplished when flanged piston bottoms 26a enter and ride beneath respective overhanging tracks 76, FIG. 10, as they round the discharge end of the machine.

Figures 2, 17, 18:
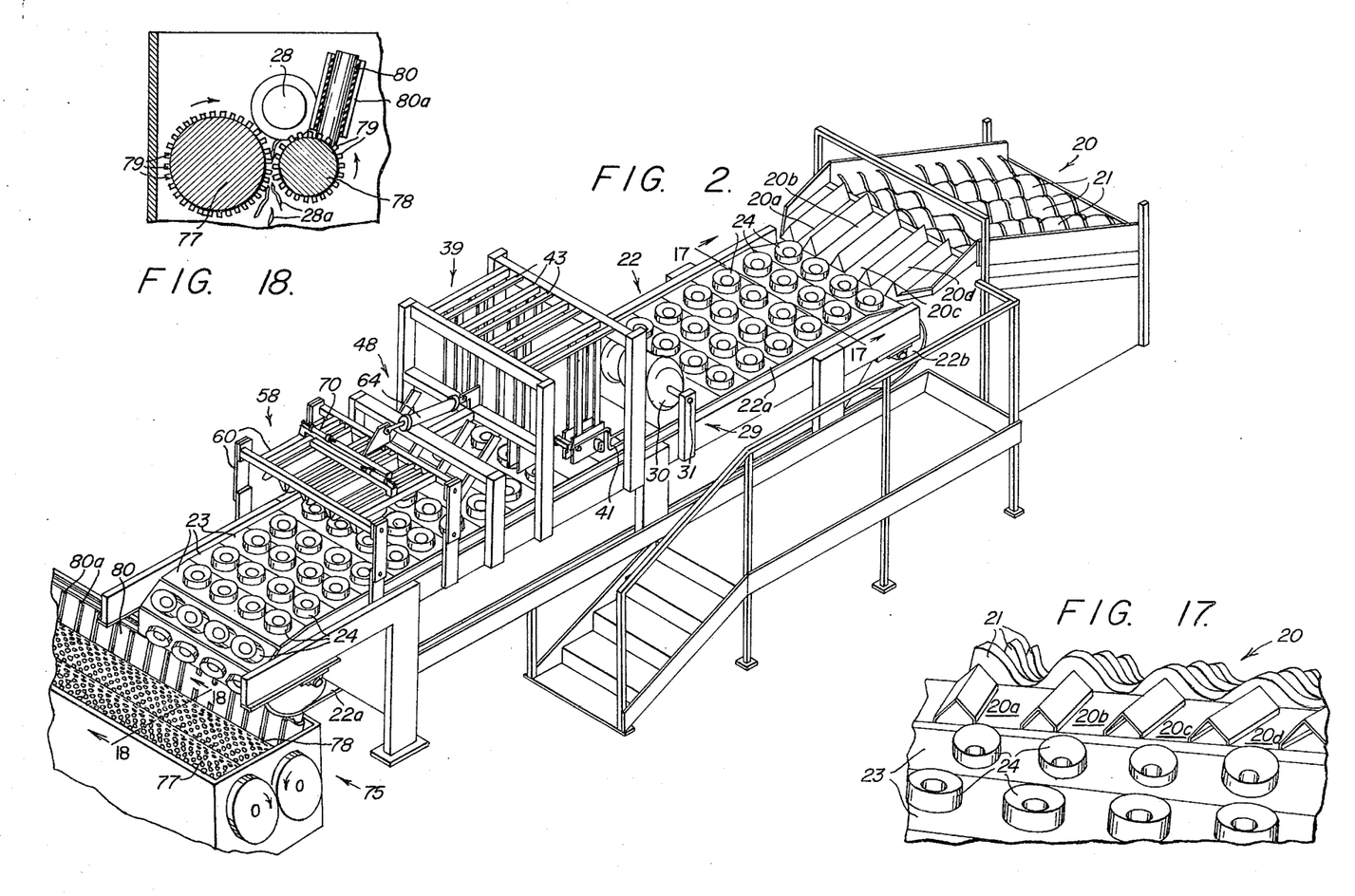
FIG. 2, a perspective view of the machine looking from above and at one side and at the discharge end thereof and including an onion aligning feeder.
FIG. 17, a fragmentary, perspective view looking from the line 17—17 of FIG. 2 and drawn to a larger scale.
FIG. 18, a fragmentary vertical section taken on the line 18—18 of FIG. 2 and drawn to a larger scale.
Figure 3:
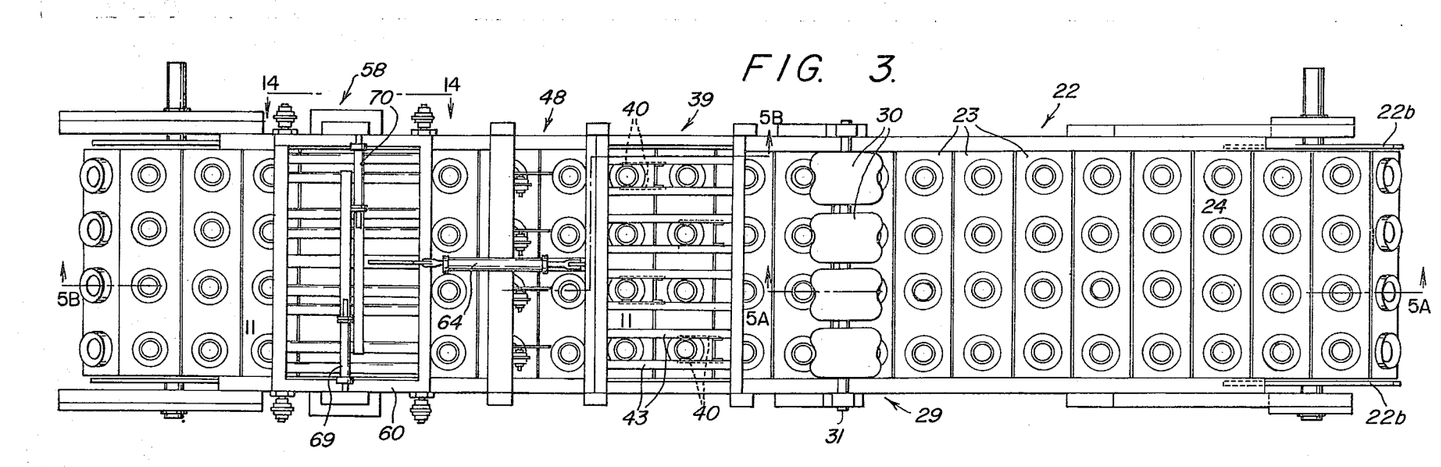
FIG. 3, a top plan view of the machine minus the feeder and the final strippings and onion bulbs separator.

As each row of cups 24 round the discharge end of the machine at station 75, FIG. 1, the stripped onions fall off into separating mechanism constituting station 75. As illustrated, see especially FIG. 18, such separating mechanism comprises a relatively large diameter (5 inch) roller 77 and a relatively small (3 inch) roller 78, both extending transversely of the machine and provided with pintles 79. These rollers are rotated toward each other so as to grasp and pull any still connected strippings 28a from the stripped onion bulbs and discharge them below. An upstanding but sloping, transversely extending, endless belt conveyor 80 provided with vertical cleats 80a is positioned above roller 78 to rotate and roll the stripped onion bulbs as it conveys them transversely of the machine to discharge laterally thereof.

Figure 6:
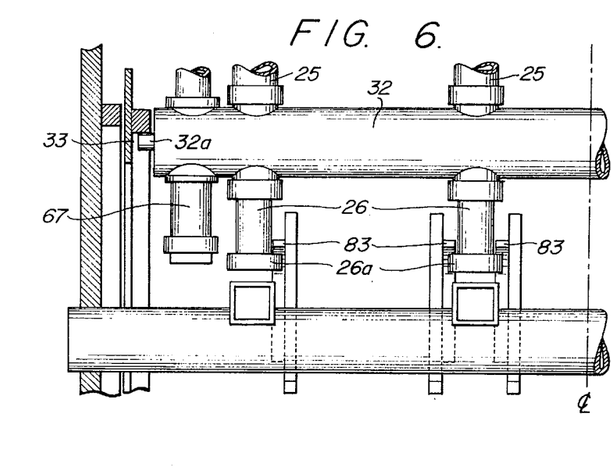
FIG. 6, a fragmentary, transverse, vertical section taken on the line 6—6 of FIG. 5A and drawn to a slightly larger scale.

On the return run of conveyor 22, the retracted pistons 26 of each row of cups strike downwardly sloping shoes 81, FIG. 5A, of a transversely extending row of same and are pushed downwardly so as to clear frame structure 82 as they travel back to the feed end of the machine. As they round such feed end, their flanged bottoms enter and ride beneath a second set of overhanging tracks 83, FIG. 6, which retract such pistons 26 and their tines 27, so the cups 24 are again ready for receiving raw, unpeeled onions from Shufflo feeder 20.

It should be noted that precautions are taken against inadvertent withdrawal of tines 27 from the onions during travel of such onions from station to station of the machine. To this end, tracks 84, FIG. 15, extend longitudinally of the machine below the respective lines of travel of pistons 26 from station 39 to the discharge end of conveyor 22 adjacent to station 75.

Whereas this invention is here specifically illustrated and described with respect to an embodiment thereof representing the best mode presently contemplated for carrying out the invention, it is to be understood that various changes therein and other embodiments may be resorted to without departing from the inventive concepts pointed out in the claims which here follow.

We claim:

1. A method of peeling onions on an industrial, mass production basis, comprising cleaning the onions as harvested; scalding the onions sufficiently to slicken the membrane interface of each cleaned onion between the outermost layer of flesh and the next inner layer without appreciably affecting the interfaces between subsequent layers of flesh; mechanically cutting off root and stem ends; mechanically cutting through said outermost layer of flesh of each onion and any skin adherent thereto longitudinally along the root-stem axis of the onion bulb, without cutting completely through any subsequent layers of flesh, to provide a slit therealong; mechanically stripping said outermost layer of flesh and any skin adherent thereto from each onion bulb along the slickened interface by gripping the said outermost layer of flesh and any skin adherent thereto of the so-slit onion bulb at opposite sides of the slit and pushing downwardly against the onion; and separating the peeled onion bulbs and the strippings, one from the other.

2. A method according to claim 1, wherein the onions are scalded at a temperature within the range of from about 180° to about 212° F. for a period within the range of about one to four minutes.

3. A method according to claim 1, wherein the scalded onions are placed on cups of a cup-type endless conveyor in seriatim relationship longitudinally of the conveyor, with their root-stem axes extending transversely of the direction of conveyor travel and are secured relative to their respective cups; the onions are raised relative to their respective cups and are passed by travel of said conveyor through an operating station at which the step of mechanically cutting off root and stem ends is performed; the onions, as still raised relative to their respective cups, are turned substantially 90° and are passed by travel of said conveyor through another operating station at which the step of mechanically cutting through the outermost layer of flesh of each onion and any skin adherent thereto longitudinally along the root-stem axes to provide respective slits therealong is performed; the so-cut onions, as still raised relative to their respective cups, are passed by travel of said conveyor through still another operating station at which the step of stripping the outermost layer of flesh and any adherent skin from the onion bulb by gripping said outermost layer of flesh and any adherent skin of each onion at opposite sides of the respective slits and pushing downwardly is performed; and the so-stripped onions are lowered relative to their respective cups and are released from their said securement relative thereto as they are passed by travel of said conveyor through yet another operating station at which the step of separating the peeled onion bulbs and the strippings one from the other is performed. pg,19

4. A method according to claim 3, wherein the onions are placed on the cup-type conveyor in transversely extending rows, the several onions in each row being passed through the several operating stations simultaneously.

5. A method according to claim 4, wherein root and stem ends of alternate onions in each row are first cut off in the operating station first specified followed by the cutting off of root and stem ends of the remaining onions in each row as the conveyor advances said rows along the path of travel of the conveyor.

* * * * *